United States Patent [19]
Nii

[11] 3,851,152
[45] Nov. 26, 1974

[54] READ-OUT DATA ENTRY SYSTEM FOR A PLURALITY OF SUPER-IMPOSED DATA ENTRY CARDS

[75] Inventor: Kazukuni Nii, Osaka, Japan

[73] Assignee: Sumitomo Electric Industries, Ltd., Osaka, Japan

[22] Filed: Mar. 5, 1973

[21] Appl. No.: 338,410

Related U.S. Application Data

[63] Continuation-in-part of Ser. No. 101,935, Dec. 28, 1970, abandoned.

[52] U.S. Cl. .................... 235/61.11 C, 235/61.12 R
[51] Int. Cl. .......................... G06k 7/04, G06k 21/00
[58] Field of Search............235/61.12 R, 61.11 E, 235/61.11 A, 61.11 C; 35/48; 250/555, 566

[56] References Cited

UNITED STATES PATENTS 2,157,036 5/1939 Torkelson .................... 235/61.12 R
2,807,728 9/1957 Kilburn et al. ............... 235/61.12 R

*Primary Examiner*—Daryl W. Cook
*Attorney, Agent, or Firm*—Carothers and Carothers

[57] ABSTRACT

A data entry system capable of simultaneously reading out a plurality of superimposed data entry cards, the data information supplied on each card read at one time by the data entry apparatus. Each card is provided with a designated code area, the area of any one card being out of alignment with the designated code area of any other card. The code is presented in the form of a plurality of perforations and the non-designated code areas of each card are totally perforated to prevent hampering in the read-out of the designated code areas of all of the remaining superimposed cards so that the data on each superimposed card is read out simultaneously and entered into the data entry system.

4 Claims, 6 Drawing Figures

READ-OUT DATA ENTRY SYSTEM FOR A PLURALITY OF SUPER-IMPOSED DATA ENTRY CARDS

CROSS-REFERENCE TO RELATED APPLICATION

This is a continuation-in-part of patent application Ser. No. 101,935 filed Dec. 28, 1970.

BACKGROUND OF INVENTION

This invention relates to a data retrieval system and the manner in which stacked superimposed token cards are employed in such a system to produce a series of information or data which is additive or a combination in nature rather than integral or compounded.

In a central data retrieval system, remote data entry apparatus may be employed wherein an operator can transmit data in the form of pulse signals representing a code to a central data processor. Several remote data entry apparatus may be provided at various points throughout a facility, such as a manufacturing plant, where sources of information exist and is entered in the data entry apparatus.

In general, a data entry apparatus includes a token card reading means which produces a signal by reading the card which has a plurality of perforations representing a code indicative of specific data. The card may be read by photoelectric means or by mechanical means such as slidably positioned rods capable of being inserted into aligned perforations in the card. Such apparatus also includes a manual entry keyboard for placing in further data relating to the fixed data already present on a token card. This additional data may be code perforated into the card.

The present invention, however, relates more to the utilization of the token cards rather than the manner and means for entering data into the system for processing.

Some token cards are individually code perforated to carry a single set of data under a single heading; whereas other token cards are each provided with a plurality of sets of data under several headings.

When the system is dependent upon a plurality of headings and the combination of the data represented by the headings is to be entered into the system from a number of data entry apparatus at different locations throughout the system, the amount of token cards needed is necessarily compounded, as there must be a token card for each heading and their combination under various headings must be prepared.

For example, when preparing an inventory, it is necessary to place in the data entry system information relating to description, part number, price, quantity, code, etc. Usually, this can be entered on one card or a number of cards. In the former case, additional cards are always necessarily needed due to changing data, and in the latter case, a great many cards are necessary due to the different types of information that can be combined in a multitude of different patterns, so that a great amount of time is necessary to find the proper cards from a large stack of token cards and the chance for error is very high while the efficiency of the total data collection system is reduced.

SUMMARY OF THE INVENTION

The principal object of this invention is the provision of a data entry apparatus wherein there is provided card reading means capable of reading a plurality of superimposed token cards inserted into the entry slot of the reader. The read-out in effect is a combination read-out, in that the data on each card is individually read out and transferred for processing. Each card is provided with a designated code area which is not in alignment with the code area of any of the other superimposed token cards so that each card can be read by the reader to read-out in a consecutive manner the coded data on the pack of token cards placed in the reader.

As an error precautionary measure, the cards for each different entry, such as inventory amount, part, code number, vendor identification, etc., is provided to be of a different height so that as the operator inserts the pack of token cards in the entry slot, the heading of each card will appear above the slot in a decreasing height arrangement. The operator is enabled to check to be sure the cards are individually the correct cards in the grouping just prior to issuing instructions to the apparatus by pushing the selector switch to permit entry of the data from the cards into the system.

The apparatus, as such, is an important feature only from the standpoint of reading the coded data on the token cards which is done in a convention manner.

Another object of the present invention is the provision of a data entry system which eliminates the need for specially trained coders, punchers and operators who, in general, do not know much about the nature of the business involved. Rather, the company personnel themselves can feed, for example, inventory and order data directly to the computer center of the data processor employing a simple token card form requiring no extra knowledge or training to employ and use. The data entry apparatus are located at any number of locations or job sites in a plant, for example. The personnel actually handling the business data at the site does so in the form of the coded cards, labeled with headings already known and used in the trade.

Thus, it is no longer necessary to prepare a plurality of token cards each bearing a series of data under several headings. Rather, the individual token cards, herein disclosed, can display several headings with each card bearing its own coded data and, as superimposed, can be read by an entry reader at the same time. Thus, the relevant cards can be easily found by one from stacks of cards and quickly entered into the system while simultaneously checking for errors in the assembled cards when the same are being entered into the system, thereby increasing the overall efficiency of the system.

The present invention should not be confused with a card retrieval system, popularly known as a "Peek-A-Boo" system. Such systems pertain to the employment of a plurality of cards each having a designated perforated area which may or may not overlap and align with such areas in other cards of the system. The cards are arranged in superimposed position to correlate various data or criteria represented by the individual cards to produce a true integrated solution or answer. Thus, each card is responsible toward an ultimate end or answer. The cards interrelate to produce the desired answer. On the other hand, the cards of the present invention permit individual reading of each of the superimposed cards simultaneously and the data of one card does not interrelate or integrate with the data or other assembled cards in the manner of the "Peek-A-Boo" system, which will become clear in the discussion of the preferred embodiments of this invention.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

DESCRIPTION OF THE PREFERRED EMBODIMENT

Figure 1:
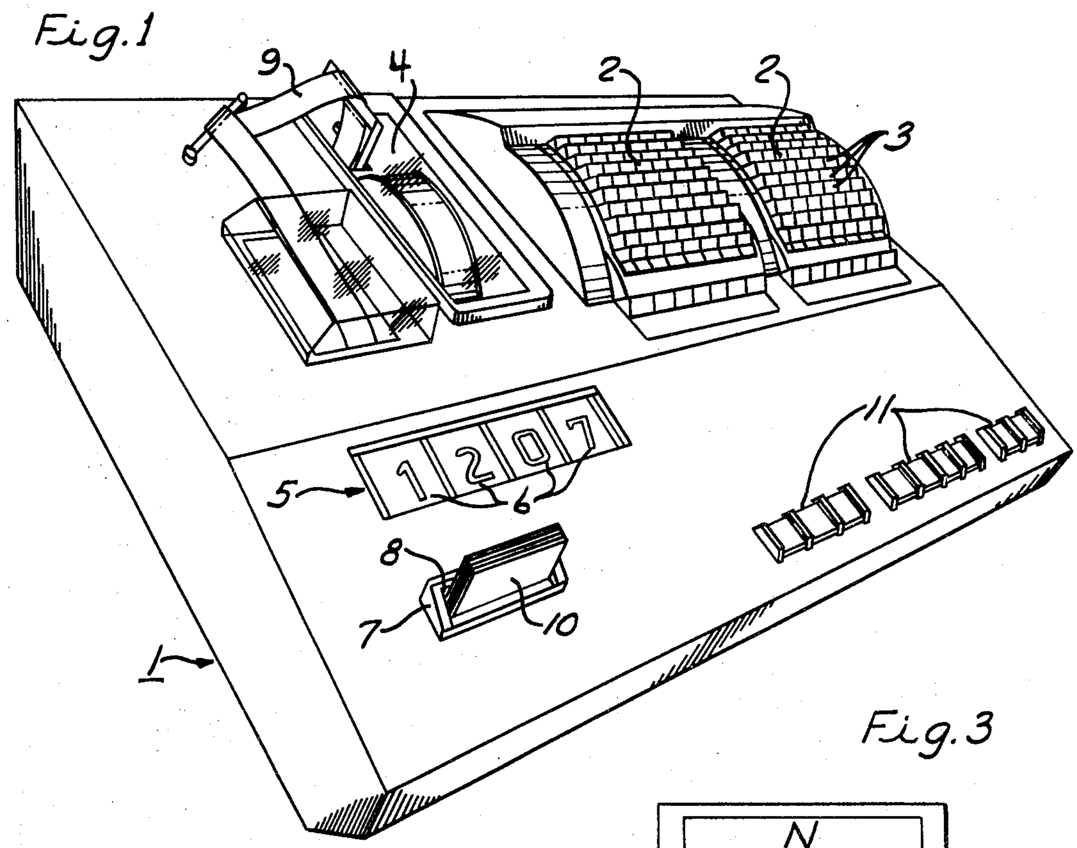
FIG. 1 is a perspective view of the data entry apparatus into which data-coded token cards are inserted for transmission of data.

Referring to FIG. 1, there is shown data entry apparatus 1 which in essence is a self-contained gathering, transmission station. Apparatus 1 is placed at a location, for example, in a manufacturing plant, where data originates. A number of the same apparatus 1 are put at different job sites within the plant so that data may be fed to a central data collecting apparatus which, in turn, feeds the data for storage, updating, etc., to a connected data control computer center. New and updated information is sent out by the computer where it is fed to a token card puncher which punches or perforates the cards in designated code areas on the cards. Thus, the token cards are produced each day, for example, according to the day's instructions. The perforated cards are then sent to the proper job sites or plant locations so that these areas of plant operation can be made current such as, for example, product or parts demand, quality control, inventory, etc.

The data entry apparatus 1 comprises the keyboard 2 which is a plurality of numbered slide keys 3 which are adapted to slide forward to place into the system variable data, such as price, quantity, etc. A punch tape mechanism 4 may be provided with the apparatus 1, which punches the paper tape according to the input data read from designated code areas from the token or data entry cards. The code information on the punched tape can then be set into the computer.

The apparatus 1 is provided with two reader areas. The first area 5 consists of a series of replacable tokens 6 which indicate data that is not immediately variable such as the date. The second area 7 consists of an entry slot 8 into which a plurality of token or data entry cards are inserted such as shown at 10.

Thus, for example, the replacable tokens 6 at area 5 would punch on tape 9 at tape mechanism 4 or set into the system the date or possibly the plant location. The inserted token cards would set in on the tape 9 next the customer number and product lot number. The slide keys 3 would set in the apparatus the variables on the tape 9 such as the delivery date, quantity, price and weight. The slide keys 3 are operated by pulling them downward, and the setting can easily be checked by the operator by reading off the figures on the selected keys along the bottom of the keyboard 2. In this manner, errors in the digit or the data format can be easily eliminated. The switches at area 11 would start the reading, recording and punching functions as well as indicate if the order is accepted or rejected, and whether the product was shipped from the factory or only a partial shipment was made.

The data entry apparatus may also enter and transmit data via transmission lines directly to the processing or computer center rather than utilize the punch tape 9.

Figure 2:
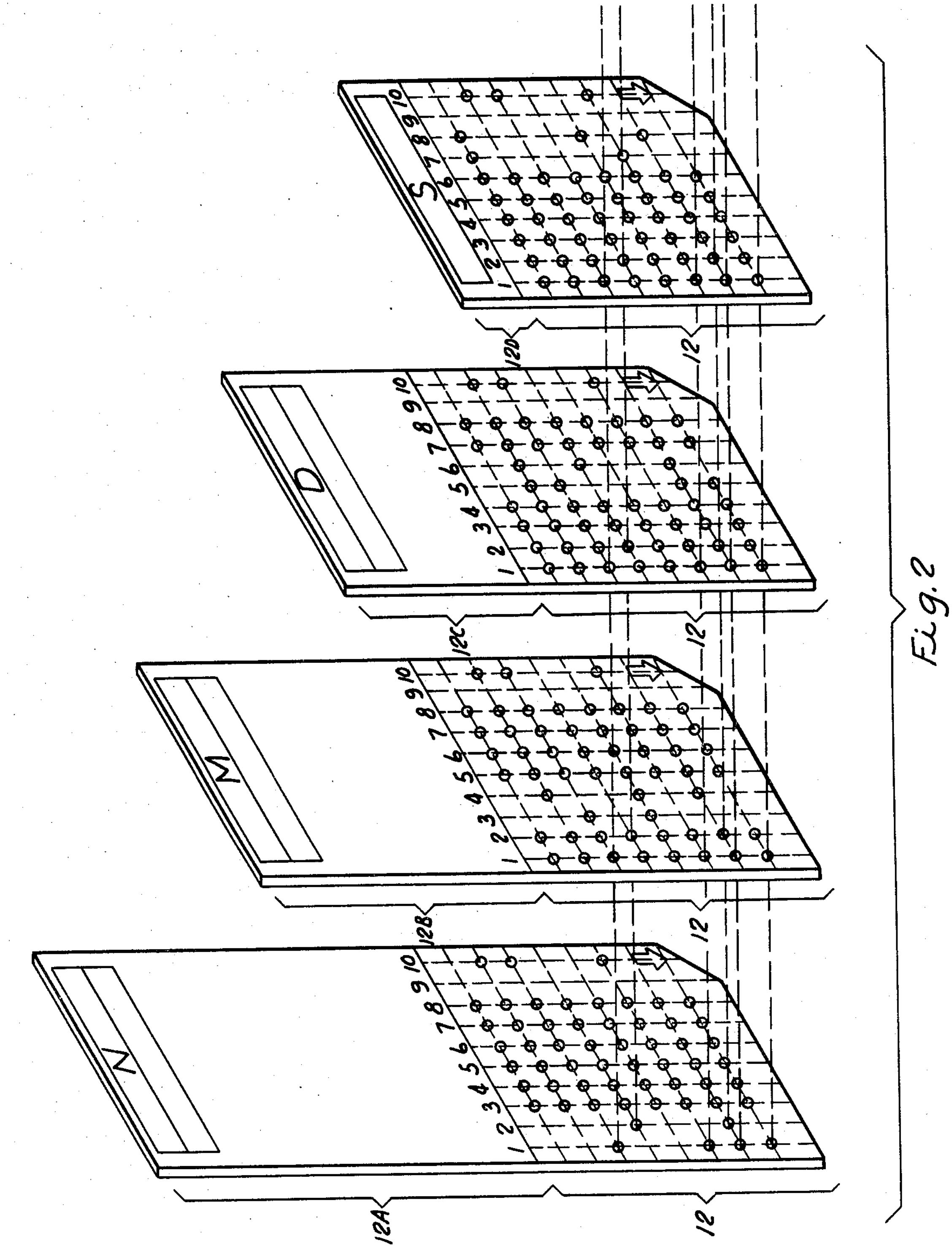
FIG. 2 is a perspective view of a plurality of aligned token cards which when superimposed are inserted into the entry slot of the data entry apparatus.

An important feature of the present invention is the employment of a plurality of superimposed data entry cards which are adapted to be read simultaneously when inserted in the data entry slot 8. In FIG. 2, a plurality of such cards are shown and respectively designated as N, M, D, and S. The token cards shown in the figures are enlarged for purposes of explanation and example only. Normally the cards are not as large or as thick as shown. The bottom portions 12 of these cards are identical in that, in the case shown, there are 10 vertical rows and 8 horizontal rows which at their point of crossing designates a point for a punch-out or perforation.

Figure 3:
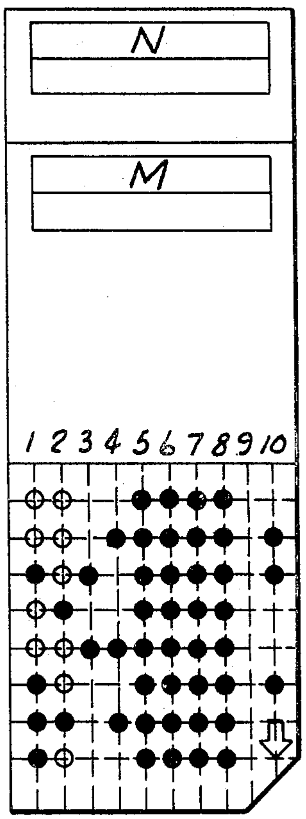
FIG. 3 is a front view of two token cards shown in FIG. 2 aligned and superimposed for insertion into the entry slot of the data entry apparatus.

Each of the cards S, D, M and N are of increasing height with the top portions 12A, 12B, 12C and 12D being of different lengths. When the cards are held together in aligned relation as shown in FIGS. 2 and 3, the respective headings N, M. D and S will be visible to the operator of the apparatus 1, thereby providing easy means for quickly determining if the proper cards from the stacks of card headings have been assembled together for read-out by the card reading means 13 in FIG. 4.

The token or data entry cards N, M. D and S are utilized as follows. Card N has a designated code area into which a selected series of perforations is made representing certain data, which area is columns 1 and 2. Card M has a designated code area at columns 3 and 4; Card D has a designated code area at columns 5 and 6; and card S has a designated code area at columns 7 and 8. The last column is utilized for error detection, such as, to check whether or not the proper number of cards are present and properly inserted into the data entry slot 8.

For the purpose of further clarity, in FIG. 3, token cards N and M are shown superimposed and ready for insertion into the data entry slot 8. For illustration only, those perforations which will be read out by the reading means 13 are shown darkened. It can be readily seen that the designated code area 1–2 of card N in FIG. 2 is not interfered with by the designated code area 3–4 of card M so that the reading means can readily read out the coded data from both cards N and M at the same time.

Figures 4, 5, 6:
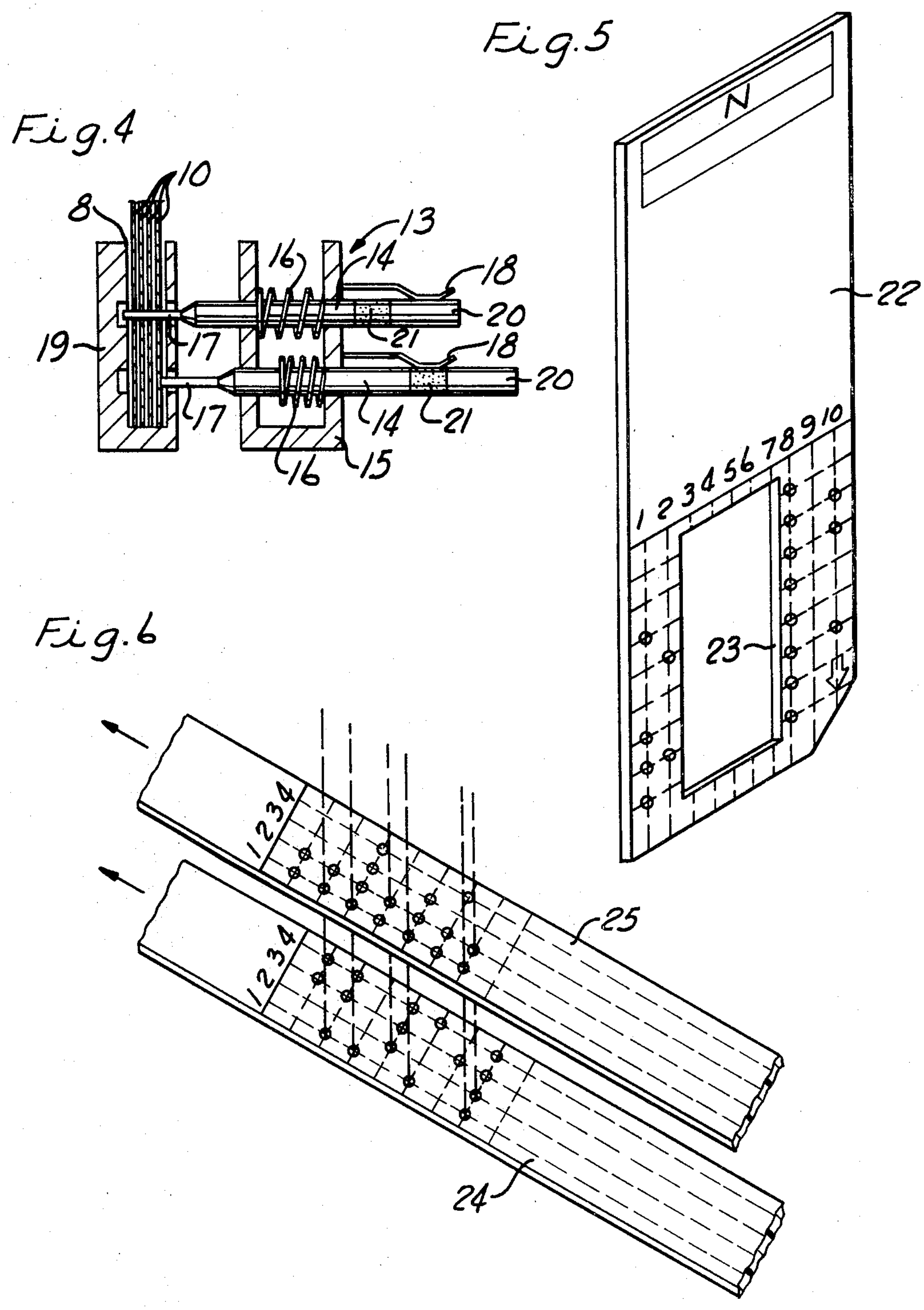
FIG. 4 is a diagrammatic view of a portion of the card reading means.
FIG. 5 is a perspective view of a modified form of the token cards shown in FIG. 2.
FIG. 6 is a perspective view showing the employment of perforated tape analogically similar to that shown with the token or data entry cards in FIG. 2.

FIG. 4 shows for purpose of illustration only, the card reading means 13 in the form of a plurality of slidably positioned pins 14, two of which are shown. The pins 14 are slidable within the frame 15, and when released for the purpose of read-out to move forward by the pressure of springs 16. Those token cards 10 that have perforations in their designated code areas will permit the ends 17 of the pins to be injected into the aligned perforations in the cards through openings provided in frame 19, which creates a signal through a circuit in the apparatus by engagement of spring contact 18 with the metallic end 20 of the pin 14. In the illustration shown, the lower pin 14 has not been allowed to be injected in the manner just described because there is no perforation in the appropriate position in the designated code area of the particular card involved. As a result, contact 18 remains on the insulated portion 21 of the pin 14.

Upon de-energization of the reading means, the pins 14 are moved to a retracted position against the pressure of the springs 16 to remove their ends 17 from within the data entry slot 8, thereby permitting removal of the token cards 10.

As previously indicated, the token or data entry cards N, M, D and S of FIG. 2 are provided with total perforation in the non-designated code areas, these perforations being identical to those in the designated code areas. Thus, the pin ends 17 can easily be injected into aligned perforations. However, the non-designated areas need not remain as perforations in the form shown in FIG. 2, but can take the form of the perforation shown in FIG. 5 wherein the N card 22 is provided to have the non-designated code areas, represented by columns 3, 4, 5 and 6, cut away as shown at 23, so that the designated code areas of the cards M and D of FIG. 2 could be read out by the reading means 13 without any interference or masking by N card 22.

From the foregoing, it should be clear that the employment of the data entry cards N, M, D and S makes it possible to aggregate information under several headings by selecting the proper cards from the different stacks of cards, which stacks are differentiated by means of card height. A large amount of data in the form of a combination of information under various headings can easily be assembled without chance of error, and with a greatly reduced number of cards that need be employed in the use of the data entry system.

For example, suppose the N heading stands for the name of the particular plant; the M heading for the name of the product; the D heading for the quantity; and the S heading for the size. It can be readily seen that if there are *n* number of plants; *m* number of products; *d* inventory of products in each plant for each product; and *s* different sizes for each such product, one would need $n \times m \times d \times s$ number of cards to have a complete record for all categories. However, by employing the token cards N, M, D and S of FIG. 2, the read-out means 13 is capable of reading out any assemblage of such cards under headings N, M, D and S, so that the information read out is a combined reading of data from N, M, D and S. Thus, for the present example, the number of total token cards under any heading N, M, D and S would be *n* plus *m* plus *d* plus *s*. This would be a greatly significant reduction of the number of token or data entry cards that need be necessary to operate the data entry apparatus.

To further exemplify, if there are four plants, 10 different products manufactured, presently 500 in inventory for all such products, and 20 different product sizes, the number of cards to include all this information for each product would be 400,000 data entry cards. However, by employing the cards herein disclosed, the number of cards necessary would be 534 data entry cards, which when properly assembled in desired superimposed groups can enter data into the data entry system that would previously be required on 400,000 data entry cards. Thus, the operator can employ a materially less number of token cards at a job site where an individual number of token cards having different heights and headings are employed and when assembled in the desired grouping, that is, N out of *n*, M out of *m*, D out of *d* and S out of *s*, are inserted in superimposed relation into the entry slot 8 of the reading means 13 where the combination of data N and M and D and S is simultaneously read and transmitted with variable data provided by the manual keyboard 2 to a central data processing unit.

While token or data entry cards have been discussed specifically, it would be an analogically obvious modification to employ a plurality of superimposed tapes 24 and 25, such as shown in FIG. 6, which are continuously fed into a tape reading means to readout the data on each tape. In this manner, there are four columns provided on the tapes to be read out. Columns 1 and 2 are designated code areas for tape 24 and columns 3 and 4 are designated code areas for tape 25. The manner of employment and combination read-out is the same as that for token cards N, M, D and S of FIG. 2.

I claim:

1. In data entry apparatus including card reading means having an entry slot adapted to receive a plurality of superimposed data entry cards, said superimposed cards characterized in that each of said cards is provided with a designated code area represented by a plurality of perforations therein, the designated code area of any one of said cards being out of alignment with the designated code area of any other of said cards when said cards are in aligned and superimposed relation, the non-designated code areas of each of said cards totally perforated to prevent the hampering of the reading of the designated code areas of all of the remaining superimposed cards thereby permitting said data entry reading means to read out all the data information simultaneously on each of said superimposed cards when inserted in said entry slot, said superimposed cards further characterized in being of different selective heights as inserted in said entry slot to visually display the written heading on each of said cards to permit visual inspection for correctness of grouping of said cards as superimposed.

2. The data entry apparatus of claim 1 characterized in that the perforations in said non-designated code areas are the same as those in said designated code areas but covering all of said areas read out by said card reading means.

3. The data entry apparatus of claim 1 characterized in that said non-designated code areas are cut out of each of said cards so that each of said cards will be read out by said card reading means.

4. In data entry apparatus including card reading means having an entry slot adapted to receive a plurality of superimposed data entry cards, said superimposed cards characterized in that each of said cards is provided with a designated code area represented by a plurality of perforations therein, the designated code area of any one of said cards being out of alignment with the designated code area of any other of said cards when said cards are in aligned and superimposed relation, the non-designated code areas of each of said cards totally perforated to prevent the hampering of the reading of the designated code areas of all of the remaining superimposed cards thereby permitting said data entry reading means to read out all the data information simultaneously on each of said superimposed cards when inserted in said entry slot, the combination of which is recorded by said apparatus, and a manual keyboard on said apparatus to place in input data relating to said combined data information from said superimposed cards.

* * * * *